US011463360B2

(12) United States Patent
Yishay

(10) Patent No.: US 11,463,360 B2
(45) Date of Patent: Oct. 4, 2022

(54) SYSTEM AND METHOD FOR RANGE MATCHING

(71) Applicant: Verint Systems Ltd., Herzliya Pituach (IL)

(72) Inventor: Yitshak Yishay, Revava (IL)

(73) Assignee: COGNYTE TECHNOLOGIES ISRAEL LTD., Herzylia Pituach (IL)

( * ) Notice: Subject to any disclaimer, the term of this patent is extended or adjusted under 35 U.S.C. 154(b) by 0 days.

(21) Appl. No.: 16/853,312

(22) Filed: Apr. 20, 2020

(65) Prior Publication Data

US 2020/0296041 A1 Sep. 17, 2020

Related U.S. Application Data

(63) Continuation of application No. 14/807,808, filed on Jul. 23, 2015, now Pat. No. 10,630,588.

(30) Foreign Application Priority Data

Jul. 24, 2014 (IL) .......................................... 233776

(51) Int. Cl.
  *H04L 45/7453* (2022.01)
  *H04L 61/5007* (2022.01)
  (Continued)

(52) U.S. Cl.
  CPC ...... *H04L 45/7453* (2013.01); *H04L 61/4552* (2022.05); *H04L 61/5007* (2022.05); *H04L 61/35* (2013.01)

(58) Field of Classification Search
  CPC ......... H04L 43/10; H04L 45/00; H04L 45/38; H04L 45/7453; H04L 47/00;
  (Continued)

(56) References Cited

U.S. PATENT DOCUMENTS 5,689,442 A 11/1997 Swanson et al.
6,279,113 B1 8/2001 Vaidya
(Continued)

OTHER PUBLICATIONS

Marcel Waldvogel et al, Scalable High Speed IP Routing Lookups, 1997, SIGCOMM, pp. 25-36 (Year: 1997).*
(Continued)

*Primary Examiner* — Michael Thier
*Assistant Examiner* — Prince A Mensah
(74) *Attorney, Agent, or Firm* — ISUS Intellectual Property PLLC; Anthony Jason Mirabito

(57) ABSTRACT

Methods and systems for range matching. The system holds a definition of one or more ranges of Internet Protocol (IP) addresses. The definition may specify any desired number of ranges of any suitable size, and some ranges may overlap one another or be contained in one another. The definition may also specify certain returned values and/or relative priorities for the various ranges. In a pre-processing phase, a hash table that is subsequently queried with addresses to be range-matched. The hash table may be updated at run-time. During operation, the system receives addresses (e.g., extracts addresses from monitored communication traffic) and identifies by querying the hash table, for each address, whether the address falls within any of the ranges.

21 Claims, 2 Drawing Sheets

(51) Int. Cl.
*H04L 61/4552* (2022.01)
*H04L 61/00* (2022.01)

(58) Field of Classification Search
CPC . H04L 45/745; H04L 61/2585; H04L 63/123; H04L 63/062; H04L 63/0263; H04L 61/35; H04L 61/4552; H04L 61/5007
See application file for complete search history.

(56) References Cited

U.S. PATENT DOCUMENTS

| | | | |
|---|---|---|---|
| 6,404,857 B1 | 6/2002 | Blair et al. | |
| 6,564,211 B1 | 5/2003 | Andreev | |
| 6,718,023 B1 | 4/2004 | Zolotov | |
| 6,741,992 B1 | 5/2004 | McFadden | |
| 6,757,361 B2 | 6/2004 | Blair et al. | |
| 6,813,273 B2 | 11/2004 | Geevarghese et al. | |
| 7,134,141 B2 | 11/2006 | Crosbie | |
| 7,216,162 B2 | 5/2007 | Amit et al. | |
| 7,225,343 B1 | 5/2007 | Honig et al. | |
| 7,287,278 B2 | 10/2007 | Liang | |
| 7,466,816 B2 | 12/2008 | Blair | |
| RE40,634 E | 2/2009 | Blair et al. | |
| 7,587,041 B2 | 9/2009 | Blair | |
| RE43,103 E | 1/2012 | Rozman et al. | |
| 8,111,697 B1 | 2/2012 | Panwar et al. | |
| 8,176,527 B1 | 5/2012 | Njemanze et al. | |
| 8,201,245 B2 | 6/2012 | Dewey et al. | |
| RE43,528 E | 7/2012 | Rozman et al. | |
| RE43,529 E | 7/2012 | Rozman et al. | |
| 8,224,761 B1 | 7/2012 | Rockwood | |
| RE43,987 E | 2/2013 | Rozman et al. | |
| 8,402,543 B1 | 3/2013 | Ranjan et al. | |
| 8,413,244 B1 | 4/2013 | Nachenberg | |
| 8,499,348 B1 | 7/2013 | Rubin | |
| 8,578,493 B1 | 11/2013 | McFadden | |
| 8,630,294 B1* | 1/2014 | Keen | H04L 45/7453 370/392 |
| 8,682,812 B1 | 3/2014 | Ranjan | |
| 8,762,948 B1 | 6/2014 | Zaitsev | |
| 8,838,951 B1 | 9/2014 | Hicks et al. | |
| 8,839,417 B1 | 9/2014 | Jordan | |
| 8,850,579 B1 | 9/2014 | Kalinichenko | |
| 8,869,268 B1 | 10/2014 | Barger | |
| 2002/0118682 A1* | 8/2002 | Choe | H04L 45/00 370/395.31 |
| 2002/0129140 A1 | 9/2002 | Peled et al. | |
| 2003/0097439 A1 | 5/2003 | Strayer et al. | |
| 2004/0230696 A1* | 11/2004 | Barach | H04L 69/22 709/238 |
| 2004/0255045 A1* | 12/2004 | Lim | H04L 45/7453 709/245 |
| 2005/0018618 A1 | 1/2005 | Mualem et al. | |
| 2005/0198468 A1 | 8/2005 | Rubin et al. | |
| 2007/0180509 A1 | 8/2007 | Swartz et al. | |
| 2007/0186284 A1 | 8/2007 | McConnell | |
| 2007/0192863 A1 | 8/2007 | Kapoor et al. | |
| 2007/0294768 A1 | 12/2007 | Moskovitch et al. | |
| 2008/0014873 A1 | 1/2008 | Krayer et al. | |
| 2008/0028463 A1 | 1/2008 | Dagon et al. | |
| 2008/0112413 A1* | 5/2008 | Pong | H04L 45/00 370/392 |
| 2008/0141376 A1 | 6/2008 | Clausen et al. | |
| 2008/0184371 A1 | 7/2008 | Moskovitch et al. | |
| 2008/0196104 A1 | 8/2008 | Tuvell et al. | |
| 2008/0261192 A1 | 10/2008 | Huang et al. | |
| 2008/0285464 A1 | 11/2008 | Katzir | |
| 2009/0106842 A1 | 4/2009 | Durie | |
| 2009/0150999 A1 | 6/2009 | Dewey et al. | |
| 2009/0158430 A1 | 6/2009 | Borders | |
| 2009/0216760 A1 | 8/2009 | Bennett | |
| 2009/0249484 A1 | 10/2009 | Howard et al. | |
| 2009/0282476 A1 | 11/2009 | Nachenberg et al. | |
| 2010/0023726 A1 | 1/2010 | Aviles | |
| 2010/0037314 A1 | 2/2010 | Perdisci | |
| 2010/0071065 A1 | 3/2010 | Khan et al. | |
| 2010/0100949 A1 | 4/2010 | Sonwane | |
| 2010/0284405 A1 | 11/2010 | Lim | |
| 2011/0099620 A1 | 4/2011 | Stavrou et al. | |
| 2011/0154497 A1 | 6/2011 | Bailey | |
| 2011/0167494 A1 | 7/2011 | Bowen et al. | |
| 2011/0271341 A1 | 11/2011 | Satish et al. | |
| 2011/0302653 A1 | 12/2011 | Frantz et al. | |
| 2011/0320816 A1 | 12/2011 | Yao et al. | |
| 2012/0017281 A1 | 1/2012 | Banerjee | |
| 2012/0167221 A1 | 6/2012 | Kang et al. | |
| 2012/0174225 A1 | 7/2012 | Shyamsunder et al. | |
| 2012/0222117 A1 | 8/2012 | Wong et al. | |
| 2012/0304244 A1 | 11/2012 | Xie et al. | |
| 2012/0311708 A1 | 12/2012 | Agarwal et al. | |
| 2013/0014253 A1 | 1/2013 | Neou | |
| 2013/0246651 A1* | 9/2013 | Keen | H04L 45/7453 709/238 |
| 2013/0333038 A1 | 12/2013 | Chien | |
| 2013/0343388 A1 | 12/2013 | Stroud et al. | |
| 2014/0075557 A1 | 3/2014 | Balabine et al. | |
| 2014/0207917 A1 | 7/2014 | Tock et al. | |
| 2014/0298469 A1 | 10/2014 | Marion et al. | |
| 2015/0098470 A1* | 4/2015 | Sun | H04L 45/748 370/392 |
| 2015/0135326 A1 | 5/2015 | Bailey, Jr. | |
| 2015/0358290 A1 | 12/2015 | Jain et al. | |

OTHER PUBLICATIONS

Notice regarding allowance of Israelian patent No. 233776 dated Feb. 21, 2019.
Notice Prior to Allowance of Israelian Patent Application No. 233776 dated Nov. 19, 2018.

* cited by examiner

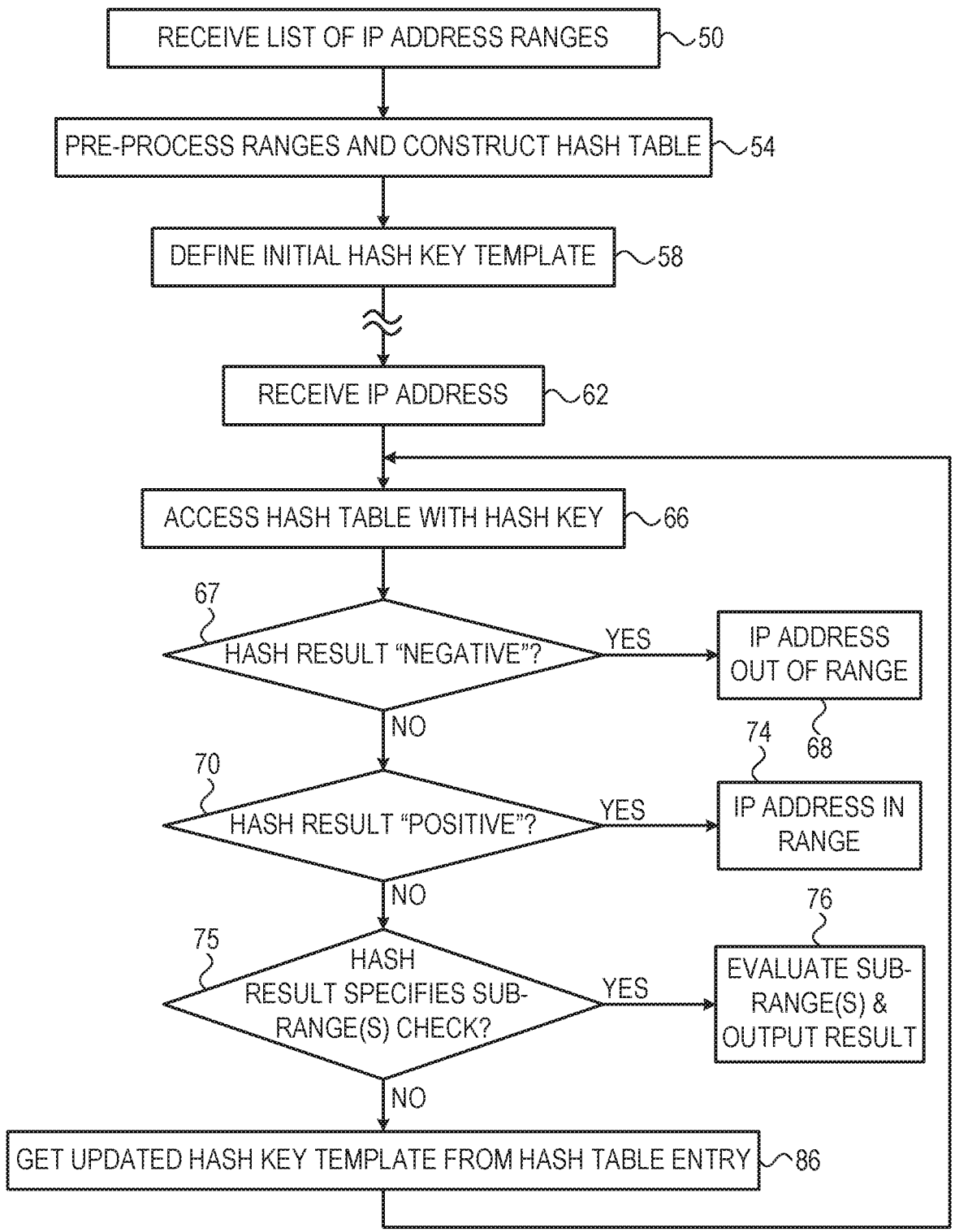

SYSTEM AND METHOD FOR RANGE MATCHING

CROSS REFERENCE TO RELATED APPLICATIONS

This application is a Continuation of application Ser. No. 14/807,808, filed Jul. 23, 2015, granted as U.S. Pat. No. 10,630,588, on Apr. 21, 2020, which claims priority to Israel Patent Application No. 233776, filed Jul. 24, 2014, which applications are hereby incorporated by this reference in their entireties as if fully set forth herein.

FIELD OF THE DISCLOSURE

The present disclosure relates generally to communication analysis, and particularly to methods and systems for IP address range matching.

BACKGROUND OF THE DISCLOSURE

In various applications it is necessary to find whether a given value is within a specified range or not. This computational problem is commonly known as "range matching" or "range querying." Range matching is useful, for example, in communication packet analysis, packet routing, firewalls, Intrusion Detection Systems (IDS) and many other applications. Various range matching techniques are known in the art. For example, Zheng et al. describes techniques for finding all the keys in a certain range over an underlying Peer-to-Peer (P2P) network, in "Distributed Segment Tree: Support of Range Query and Cover Query over DHT," Electronic publications of the 5$^{th}$ International Workshop on Peer-to-Peer Systems (IPTPS'06), 2006, which is incorporated herein by reference.

U.S. Pat. No. 7,394,809, whose disclosure is incorporated herein by reference, describes a packet classifier having a forest of hash tables. The forest of hash tables includes a number of hash tables, each hash table having a bit mask corresponding to an equivalent set of rules. Each hash table includes a number of entries, wherein an entry of a hash table may correspond to a rule. One or more of the hash tables may include a marker in one entry, wherein the marker identifies another one of the hash tables. The hash table identified by the marker is a descendant of the hash table in which the marker is placed.

SUMMARY OF THE DISCLOSURE

An embodiment that is described herein provides a method including pre-processing a definition of one or more ranges of addresses, so as to generate a hash table that is queried by a key produced by applying a template to an address, wherein the hash table comprises multiple entries, such that a given entry specifies either a conclusive result of whether the address falls within one or more of the ranges, or an inconclusive result with an updated template for applying to the address before querying the hash table again. A first key is produced by applying a first template to an input address, and querying the hash table with the first key. Depending on the result, either the result is output, or the hash table is queried again in accordance with the updated template specified in an entry of the hash table corresponding to the first key.

In some embodiments, querying the hash table again includes, if the result given in the entry corresponding to the first key is inconclusive, applying the updated template specified in the entry to the input address to produce a second key, and querying the hash table again with the second key. In an embodiment the method includes concluding that the input address does not fall in any of the ranges, if the first key does not match any of the entries in the hash table.

In an embodiment, the first template specifies a first subset of bits of the input address to be included in the first key, and the second template specifies a second subset of the bits of the input address, different from the first subset, to be included in the second key. In another embodiment, at least one entry of the hash table specifies a logical condition that, when applied to the input address, produces a conclusive result of whether the input address falls within one or more of the ranges. In an example embodiment, the logical condition specifies one or more sub-ranges for checking against the address.

In yet another embodiment, at least one entry of the hash table specifies multiple address sub-ranges that correspond to multiple respective conclusive results. In an embodiment, the conclusive result further indicates at least one of the ranges in which the address falls. In still another embodiment, the ranges are assigned respective priorities, and pre-processing the definition comprises defining the hash table so as to return range-matching results in accordance with the priorities. In an embodiment, the method includes updating the entries to reflect a change in the ranges, without interrupting access to the entries.

There is additionally provided, in accordance with an embodiment that is described herein, an apparatus including a memory and a processor. The memory is configured to hold, for a definition of one or more ranges of addresses, a hash table that is queried by a key produced by applying a template to an address, wherein the hash table comprises multiple entries, such that a given entry specifies either a conclusive result of whether the address falls within one or more of the ranges, or an inconclusive result with an updated template for applying to the address before querying the hash table again. The processor is configured to pre-process the definition so as to generate the hash table, to produce a first key by applying a first template to an input address, to query the hash table with the first key, and, depending on the result, to either output the result or to query the hash table again in accordance with the updated template specified in an entry of the hash table corresponding to the first key.

There is also provided, in accordance with an embodiment that is described herein, a computer software product, the product including a tangible non-transitory computer-readable medium in which program instructions are stored, which instructions, when read by a processor, cause the processor to pre-process a definition of one or more ranges of addresses so as to generate a hash table that is queried by a key produced by applying a template to an address, wherein the hash table comprises multiple entries, such that a given entry specifies either a conclusive result of whether the address falls within one or more of the ranges, or an inconclusive result with an updated template for applying to the address before querying the hash table again, to produce a first key by applying a first template to an input address, and querying the hash table with the first key, and, depending on the result, to either output the result or to query the hash table again in accordance with the updated template specified in an entry of the hash table corresponding to the first key.

The present disclosure will be more fully understood from the following detailed description of the embodiments thereof, taken together with the drawings in which:

BRIEF DESCRIPTION OF THE DRAWINGS

FIG. 2 is a flow chart that schematically illustrates a method for IP address range matching, in accordance with an embodiment that is described herein.

DETAILED DESCRIPTION OF EMBODIMENTS

Overview

Figure 1:
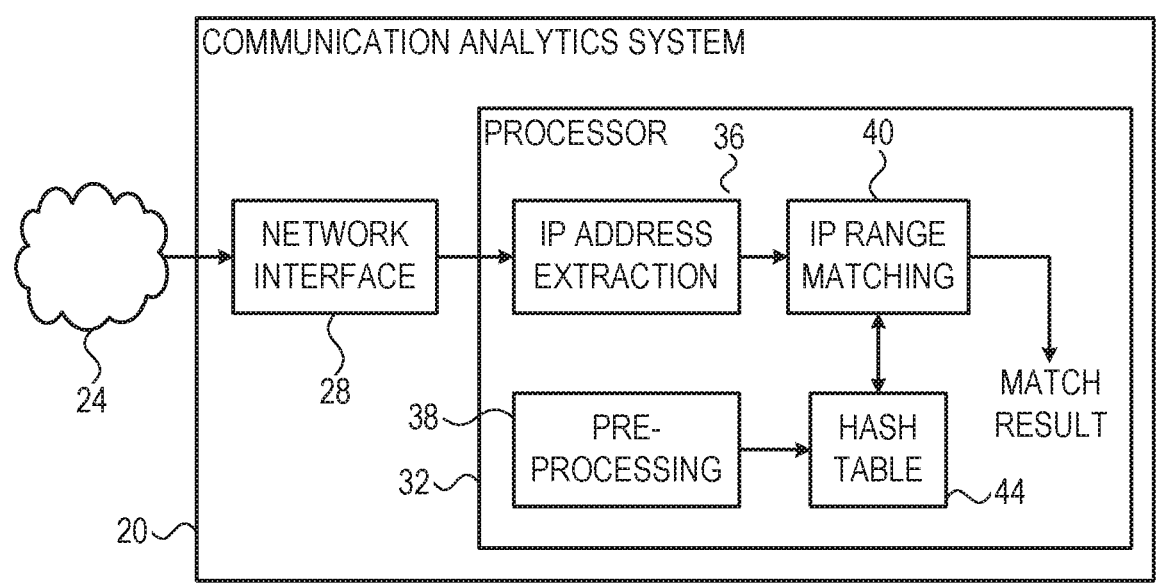
FIG. 1 is a block diagram that schematically illustrates a communication analytics system, in accordance with an embodiment that is described herein.

Embodiments that are described herein provide improved methods and systems for range matching. The embodiments described herein refer mainly to range matching of addresses, e.g., Internet Protocol (IP) addresses, in a communication analytics system. The disclosed techniques, however, are not limited to this particular application, and may be used for range matching of any other suitable numerical values.

In some embodiments, the system holds a definition of one or more ranges of IP addresses. The definition may specify any desired number of ranges of any suitable size, and some ranges may overlap one another or be contained in one another. The definition may also specify certain returned values and/or relative priorities for the various ranges. In some embodiments, the system carries out a pre-processing phase, which derives from the definition a hash table that is subsequently queried with addresses to be range-matched. The hash table may be updated at run-time, e.g., in response to changes in the range definition.

During operation, the system receives addresses (e.g., extracts addresses from monitored communication traffic) and identifies by querying the hash table, for each address, whether the address falls within any of the ranges. If so, the system typically also identifies which of the ranges contains the address. This process is referred to herein as "range matching." The hash table constructed during the pre-processing phase also accounts for the specified priorities among ranges, without requiring additional effort at run-time.

The hash table is designed to be accessed with a key that is produced by applying a template to the address to be range-matched. In one embodiment, the template comprises a mask that defines a subset of the bits of the address.

In the disclosed embodiments, a given entry of the hash table may provide a conclusive or inconclusive result. A conclusive result may comprise either a positive match indicating the range or ranges containing the address, or a negative match indicating that the address does not fall within any of the ranges. An inconclusive result indicates that it is not possible to decide on a positive or negative match using the currently-used key. In some embodiments, an entry that returns an inconclusive result also specifies an updated template (e.g., mask) that should be applied to the address before accessing the hash table again.

In a typical flow, the system applies an initial template to the address, and accesses the hash table with the resulting key. If the hash-table entry corresponding to the key indicates a conclusive result, the system outputs or acts upon the result, and the process terminates. If the hash-table entry indicates an inconclusive result, the system extracts an updated template from the hash-table entry, generates an updated key by applying the updated template to the address, and accesses the hash table again using the updated key.

The process above may be repeated several times: In some scenarios the system may need to access the hash table multiple times until achieving a conclusive (positive or negative) match. Each access of the hash table uses a different template (and therefore a different key), as specified in the previously-visited hash-table entry. In some embodiments, an entry that returns an inconclusive result specifies a logical condition instead of an updated template. The logical condition may specify, for example, a positive match if the IP address falls in some specified sub-range, and a negative match otherwise. Applying the logical condition to the address thus yields a conclusive match.

In designing the disclosed hash table structures, it is possible to trade memory size against computational complexity and matching speed. For a given set of address ranges, if the hash table is designed with a large number of entries (i.e., large memory space), the average number of repeated accesses to the table is reduced (i.e., high range-matching speed). The extreme case would be to generate hash-table entries per each value in the range-A design that would require extremely large memory but incur no repeated accesses. This sort of solution is not feasible in most cases, since memory resources are limited. For example, to meet throughput and latency goals, it is advantageous for the hash table to fit into a small processor cache memory. At the other extreme, when the number of entries is small (i.e., small memory space), the average number of repeated accesses to the table is increased (i.e., reduced range-matching speed). Intermediate designs are similarly applicable.

The disclosed range matching techniques enable straightforward tuning of performance to match desired speed and memory space requirements, and also lend themselves to smooth and seamless reconfiguration of the hash table.

System Description

FIG. 1 is a block diagram that schematically illustrates a communication analytics system 20, in accordance with an embodiment that is described herein. System 20 monitors and analyzes communication packets that are exchanged over a communication network 24, such as the Internet.

As part of the analysis process, system 20 extracts Internet Protocol (IP) addresses from the monitored packets, and performs a range matching process on the IP addresses. The system may then decide how to handle the packets depending on the range matching results. For example, system 20 may hold a definition of ranges of IP addresses that are of interest, and analyze only packets whose IP addresses fall inside one of the ranges of interest. In alternative embodiments, the disclosed range matching techniques can be used in routers or other network elements that route the packets depending on the range-matching results.

In the present example, system 20 comprises a network interface 28 for monitoring packets exchanged over network 24, and a processor 32 that is configured to carry out the range matching processes described herein. Processor 32 comprises a pre-processing unit 38 that performs the pre-processing phase described above, an address extraction unit 36 that extracts IP addresses from monitored packets at run-time, and a range matching unit 40 that applies range matching to the extracted addresses.

Unit 40 produces match results that are used by system 20 for subsequent processing, e.g., to decide which packets to discard and which to analyze. Processor further comprises a memory 44 that stores a hash table. Memory 44 may comprise any suitable memory type. Typically, the hash table is kept sufficiently small to fit in the Random Access Memory (RAM) cache memory of processor 32. In the description that follows, the hash table and the memory holding the hash table are referred to interchangeably as "memory 44" or "hash table 44," for the sake of brevity. Hash table 44 has a unique structure that enables rapid and efficient range matching, as will be described in detail below.

The configurations of system 20 shown in FIG. 1 is as example configuration that is chosen purely for the sake of conceptual clarity. In alternative embodiments, any other suitable system configuration can be used. For example, the embodiments described herein refer mainly to IP addresses, and are applicable, for example, in IPv4 or IPv6 networks. The disclosed techniques, however, are not limited to range matching of IP addresses, and can be used for range matching of other types of addresses. Moreover, the disclosed techniques can generally be used for range matching of any other suitable numerical values (e.g., packet lengths or port numbers), either instead of or in addition to address range matching. When range matching is performed in multiple dimensions (e.g., both IP address and port number), the system would typically carry out the process one dimension at a time.

Certain elements of system 20 can be implemented using hardware, such as using one or more Application-Specific Integrated Circuits (ASICs) or Field-Programmable Gate Arrays (FPGAs) or other device types. Additionally or alternatively, certain elements of system 20 can be implemented using software, or using a combination of hardware and software elements.

Typically, processor 32 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Range Matching Using Hash Table Lookup

In some embodiments, processor 32 receives and stores a definition of one or more ranges of IP address of interest. Unit 38 pre-processes this definition so as to produce hash table 44. The definition may specify any number of ranges, and each range may be of any suitable size. Ranges may be disjoint, overlapping or contained in one another, as desired. The ranges may be assigned respective relative priorities.

In the description that follows, each range is represented using the notation X1.X2.X3.X4/N, wherein X1.X2.X3.X4 denotes a 32-bit IP address (X1 . . . X4 are integer numbers between 0 and 255), and N denotes the number of Most Significant Bits (MSBs) that span the range. For example, 56.176.23.0/20 specifies a range of $2^{(32-20)}=2^{12}$ IP addresses starting from 56.176.23.0. As another example, 56.176.23.14/32 denotes a range that includes the single address 56.176.23.14. Alternatively, however, the disclosed techniques can be used with any other suitable notation.

In one example, the definition may comprise the following three ranges:
Range A: [69.63.176.0/20, 69.63.176.0/20, 204.15.20.0/22]
Range B: [102.0.0.0/7, 104.0.0.0/8, 106.0.0.0/8, 179.0.0.0/8, 185.0.0.0/8]
Range C: [184.82.162.163/32, 184.22.103.202/32, 158.255.211.28/32]

For the above definition, the range matching process may return one of two possible results: Either the address falls in the range (together with the identities of the range(s) in which the address falls); or the address does not fall in the range.

In some embodiments, processor 32 carries out a pre-processing phase that translates the range definition into hash table 44. The processor later checks whether a given address falls in one or more of the ranges by querying the hash table.

Hash table 44 is designed to be accessed by a key, which is generated by applying a template to the address. In the embodiments described herein, the template comprises a bit mask, and the processor generates the key by calculating a bit-wise AND between the bit mask and the address. Generally, however, any other suitable template can be used. One example is a "DEV" operator used with non-binary numbers.

Consider, for example, the range definition R1= [102.0.0.0/7, 104.160.0.0/12, 106.0.0.0/8, 179.1.2.0/24]. In an embodiment, processor 32 translates this range definition into the following hash table:

TABLE 1

| Key | Scenario | Result | Range size (after scenario) |
|-----|----------|--------|-----------------------------|
| 102 | All | R1 | 16M |
| 103 | All | R1 | 16M |
| 104 | (104.160.0.0-104.175.255.255) | R1 | 1M |
| 106 | All | R1 | 16M |
| 179 | (179.1.2.0-179.1.2.255) | R1 | 256 |

In the example of Table 1, the template comprises an 8-bit mask that selects the eight most-significant bits of the IP address and masks the other bits. In other words, the key for accessing the table comprises the eight most-significant bits of the address. Alternatively, however, any other suitable number of bits can be used, typically depending on the pre-processing phase.

The first entry of Table 1 indicates that all addresses that match the key (i.e., all addresses of the form 102.X.X.X) fall inside range R1. The second entry indicates that all addresses of the form 103.X.X.X also fall inside range R1. Note that this information was implicit in the original range definition, and was added by the processor when constructing the hash table.

The third entry in Table 1 indicates that addresses whose upper sixteen bits are between 104.160 and 104.175 fall in the range R1. In this entry, the "SCENARIO" attribute indicates the partial subset of the addresses matching the key (104) that are handled by this entry. In this example, the hash-table entry specifies a simple sub-range checking. An alternative embodiment, in which a hash-table entry specifies accessing the hash table again with a different key, is described further below.

The fourth entry indicates that all addresses of the form 106.X.X.X fall in range R1. The fifth entry in Table indicates that addresses between 179.1.2.0 and 179.1.2.255 fall in the range R1. Again, the "SCENARIO" attribute indicates the partial subset of the addresses matching the key (179) that are handled by this entry.

Note that most of the possible hash key values (all the values other than 102, 103, 104, 106 and 179) are not specified in the hash table at all. In this embodiment, and in the examples that follow, a key that does not match any entry of the hash table indicates that the corresponding address does not fall in any of the ranges. This convention is highly efficient in terms of memory space.

In some embodiments, in addition to a positive result indicating that the address falls in one of the ranges, the hash table also returns the identity of the range or ranges in which the address falls. Consider, for example, the following definition:

Range1=[102.0.0.0/7, 104.160.0.0/12, 106.0.0.0/8, 179.1.2.0/24]

Range2=[104.165.13.0/24, 106.0.0.0/16, 108.25.0.0/16]

In an embodiment, processor 32 divides the ranges in the definition into a set of sub-ranges, and defines for each sub-range whether it belongs to Range1, Range2 or both, as follows:

TABLE 2

| | |
|---|---|
| 102.0.0.0/7 | Range1 |
| 104.160.0.0-104.165.12.255 | Range1 |
| 104.165.13.0-104.165.13.255 | Range1 and Range2 |
| 104.165.14.0-104.175.255.255 | Range1 |
| 106.0.0.0-106.0.255.255 | Range1 and Range2 |
| 106.1.0.0-106.255.255.255 | Range1 |
| 108.25.0.0-108.25.255.255 | Range2 |

In another embodiment, the hash table has the following form:

TABLE 3

| Key | Scenario | Result | Range size (after scenario) |
|---|---|---|---|
| 102 | All | R1 | 16M |
| 103 | All | R1 | 16M |
| 104 | 104.X | Access hash table again. Updated template is upper 16 bits | 1M |
| 104.160 | All | R1 | 65K |
| 104.161 | All | R1 | 65K |
| 104.162 | All | R1 | 65K |
| 104.163 | All | R1 | 65K |
| 104.164 | All | R1 | 65K |
| 104.165 | (104.165.0.0-104.165.12.255) | R1 | 3328 |
| | 104.165.13.0-104.165.13.255 | R1 + R2 | 256 |
| | 104.165.14.0-104.165.255.255 | R1 | 61696 |
| 104.166 | All | R1 | 65K |

In the present example, processor 32 first accesses the hash table of Table 3 using an 8-bit key, which is generated using a template that retains only the eight most significant bits of the address. The first three entries of the table relate to this key. According to the first entry, any address of the form 102.X.X.X falls in R1. According to the second entry, any address of the form 103.X.X.X falls in R1.

The third entry of Table 3 returns an inconclusive result. In the present range definition, some addresses of the form 104.X.X.X fall in R1, while other addresses of the form 104.X.X.X fall outside R1. In other words, it is impossible to make a conclusive range matching decision based on the initial 8-bit key.

In this embodiment, the third entry of Table 3 instructs processor 32 to access the hash table again using an updated key. The entry also specifies an updated template for generating the updated key. In the present example, the updated template retains the sixteen most significant bits of the address.

When the initial access to the hash table hits the third entry (i.e., when the address begins is of the form 104.X.X.X), processor 32 generates an updated 16-bit key using the updated template specified in the third entry, and accesses the hash table again with the updated key. The second access is directed to the fourth through ninth entries of the hash table of Table 3.

According to the fourth through eighth entries, if the address is of the form 104.160.X.X, 104.161.X.X, 104.162.X.X, 104.163.X.X or 104.164.X.X, the hash table returns a conclusive result that the address falls inside R1. According to the ninth entry of Table 3, the address is checked against three sub-ranges, two of which indicate that the address falls in R1, and one indicates that the address falls both in R1 and in R2.

In the example above, processor 32 reaches a conclusive range matching result after a maximum of two accesses to the hash table. This maximum is a design choice. The hash table can be designed to have a smaller number of entries, at the expense of a larger probability for multiple accesses, or vice versa.

The example above illustrates the technique of a hash-table entry that specifies an updated template for modifying the key before accessing the hash table again. In the above example, the initial template retains a certain number of most-significant bits of the key, and the updated template retains a larger number of most-significant bits. In alternative embodiments, however, the templates may retain any other suitable subsets of bits. A template may even retain all the bits of the address, thereby restricting the match to a range having a single address value. The latter template requires more memory but in return improves performance.

In the above example, a conclusive result is obtained after a maximum of two accesses of the hash table. In alternative embodiments, the hash table can be designed to allow a larger number of accesses, usually achieving a smaller table.

In some embodiments, the definition specifies relative priorities among the ranges. For a given IP address, the range matching process should return the highest-priority range in which the address falls, or alternatively return all the ranges in which the address falls in ascending order or priority. In these embodiments, processor 32 constructs hash table 44 so as to account for the specified priorities. When using this technique, the relative priorities are handled at the pre-processing phase, and do not require additional computational effort at run-time.

FIG. 2 is a flow chart that schematically illustrates a method for IP address range matching, carried out by processor 32 of system 20, in accordance with an embodiment that is described herein. The method begins with processor 32 receiving a definition of ranges of IP addresses, at a range input step 50. Pre-processing unit 38 of processor 32 pre-processes the ranges so as to construct hash table 44, at a pre-processing step 54. Range matching unit 40 defines an initial hash key template (e.g., mask), at a template initialization step 58. At this stage the system is ready to start the range matching process.

At a traffic input step 62, network interface 28 receives a packet from network 24 and forwards the packet to address extraction unit 36 in processor 32. Extraction unit 36 extracts an IP address (source and/or destination IP address) from the packet.

Unit 40 generates a hash key by applying the initial template to the address received at step 62. Unit 40 then accesses hash table 44 with the resulting hash key, at a hash table querying step 66.

At a negative checking step 67, unit 40 checks whether the hash result is negative, i.e., whether the hash key is not mapped to any of the hash-table entries. If so, unit 40 outputs a negative result, at a negative termination step 68.

Otherwise, at a positive checking step 70, unit 40 checks whether the hash result is positive, i.e., whether the hash key matches a hash-table entry indicating that the address falls in one or more of the ranges. If so, unit 40 outputs a positive result, typically along with the identity or identities of the range or ranges in which the address falls, at a positive termination step 74.

Otherwise, at a sub-range checking step 75, unit 40 checks whether the hash table entry specifies a sub-range check. If so, unit 40 checks whether the address falls in the sub-range specified in the entry, at a sub-range evaluation step 76. If the address falls in the sub-range, the match result is positive. If not, the match result is negative.

Both a positive result and a negative result are considered conclusive results, after which the range matching process terminates. If steps 67, 70 and 75 do not yield a conclusive result, then the hash key matches a hash-table entry that indicates an inconclusive result.

In this case, unit 40 obtains an updated key template (which may be different for every key) from the hash-table entry, at a template updating step 86. The method then loops back to step 66 above, in which unit 40 generates an updated key by applying the updated template to the address, and then accesses the hash table again using the updated key. As explained above, unit 40 may access the hash table several time, each time using a different template, until reaching a conclusive range matching result.

In some embodiments, an entry of hash table 44 specifies multiple address sub-ranges with respective range matching results. Consider, for example, Table 4 below:

TABLE 4

| Key | Scenario | Result | Range size |
|---|---|---|---|
| 102 | All | R1 | 16M |
| 103 | All | R1 | 16M |
| 104 | (104.160.0.0-104.165.12.255) ⇒ R1 | R1 | 1M |
|  | (104.165.13.0-104.165.13.255) ⇒ R1 + R2 | R1 + R2 |  |
|  | (104.165.14.0-104.175.255.255) ⇒ R1 | R1 |  |

In this example, an address of the form 104.X.X.X will match the third hash-table entry. This entry specifies three sub-ranges: If the address is between 104.160.0.0 and 104.165.12.255, the range matching result is that the address falls in R1. If the address is between 104.165.13.0 and 104.165.13.255, the result is that the address falls in both R1 and R2. If the address is between 104.165.14.0 and 104.175.255.255, the result is that the address falls in R1.

Note that the union of these sub-ranges does not cover all the addresses of the form 104.X.X.X. Therefore, some addresses that match the third hash-table entry will not match any of the three sub-ranges. Such addresses will return a negative result, i.e., they do not fall in any of the ranges. At the pre-processing phase it is possible to define the hash table with entries specifying sub-range checks and entries specifying re-access with different templates, in any desired order.

Table 5 below shows yet another example of a hash table, in accordance with an embodiment.

TABLE 5

| Key | Scenario | Result | Range size |
|---|---|---|---|
| 102 | All | R1 | 16M |
| 103 | All | R1 | 16M |
| 104 | 104.X | Access hash table again. Updated template is upper 16 bits | 1M |
| 104.160 | All | R1 | 65K |
| 104.161 | All | R1 | 65K |
| 104.162 | All | R1 | 65K |
| 104.163 | All | R1 | 65K |
| 104.164 | All | R1 | 65K |
| 104.165 | 104.165.X | R1 | 65K |

In some embodiments, the hash table may comprise more than one entry that matches a give key. Unit 40 typically stops at the first matching hash-table entry. Therefore, by proper ordering of the entries in the hash table at the pre-processing phase, it is possible to set priorities among matches.

In some embodiments, processor 32 updates hash table 44 in response to a change in the IP address ranges of interest. Processor 32 typically identifies the hash-table entries that are affected by the change, and updates the entries one after the other. Typically, there is no need to lock the access to the hash table during the update. The update can thus be performed at run-time (e.g., using a single writing process and atomic operations, and possibly multiple reading processes) without disrupting the system operation. In rare occasions, unit 40 may return two range matching results for the same address during updating of the hash table, but this scenario is considered tolerable.

Although the embodiments described herein mainly address range matching in communication analytics applications, the principles of the present disclosure are not limited to communication analytics, can also be used for range matching in other fields.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
  pre-processing a definition of one or more ranges of addresses of interest, so as to
    determine a number of bits of a first template comprising a mask that selects the number of most significant bits of an address and masks the other bits; and
    generate a single hash table that is queried by a first key produced by applying the first template to an address, wherein the single hash table comprises multiple entries, such that a given entry specifies either a conclusive result of whether the address falls within one or more of the ranges, or an inconclusive result with an updated template for applying to the address before querying the single hash table again;

producing the first key by applying the first template to an input address, and querying the single hash table with the first key; and depending on the result, either outputting the result or querying the single hash table again in accordance with the updated template specified in an entry of the single hash table corresponding to the first key, wherein the updated template includes more significant bits of the input address than the first template.

2. The method according to claim 1, wherein querying the single hash table again comprises, if the result given in the entry corresponding to the first key is inconclusive, applying the updated template specified in the entry to the input address to produce a second key, and querying the single hash table again with the second key.

3. The method according to claim 1, wherein if the first key does not match any of the entries in the single hash table, concluding that the input address does not fall in any of the ranges.

4. The method according to claim 1, wherein the first template specifies a first subset of bits of the input address to be included in the first key, and wherein a second template specifies a second subset of the bits of the input address, different from the first subset, to be included in the second key.

5. The method according to claim 1, wherein at least one entry of the single hash table specifies a logical condition that, when applied to the input address, produces a conclusive result of whether the input address falls within one or more of the ranges.

6. The method according to claim 5, wherein the logical condition specifies one or more sub-ranges for checking against the address.

7. The method according to claim 1, wherein at least one entry of the single hash table specifies multiple address sub-ranges that correspond to multiple respective conclusive results.

8. The method according to claim 1, wherein the conclusive result further indicates at least one of the ranges in which the address falls.

9. The method according to claim 1, wherein the ranges are assigned respective priorities, and wherein pre-processing the definition comprises defining the single hash table so as to return range-matching results in accordance with the priorities.

10. The method according to claim 1, and comprising updating the entries to reflect a change in the ranges, without interrupting access to the entries.

11. An apparatus, comprising:
a memory, which is configured to hold, for a definition of one or more ranges of addresses of interest, a single hash table that is queried by a first key produced by applying a first template, comprising a mask that selects a number of most-significant bits of an address and masks the other bits, to an address, wherein the single hash table comprises multiple entries, such that a given entry specifies either a conclusive result of whether the address falls within one or more of the ranges, or an inconclusive result with an updated template for applying to the address before querying the single hash table again; and a processor, which is configured to pre-process the definition so as to
determine the number of most-significant bits of the mask;
generate the single hash table, to produce a first key by applying the first template to an input address, to query the single hash table with the first key, and, depending on the result, to either output the result or to query the single hash table again in accordance with the updated template specified in an entry of the single hash table corresponding to the first key, wherein the updated template includes more of significant bits of the input address than the first template.

12. The apparatus according to claim 11, wherein, if the result given in the entry corresponding to the first key is inconclusive, the processor is configured to apply the updated template specified in the entry to the input address to produce a second key, and to query the single hash table again with the second key.

13. The apparatus according to claim 11, wherein the processor is configured to conclude that the input address does not fall in any of the ranges if the first key does not match any of the entries in the single hash table.

14. The apparatus according to claim 11, wherein the first template specifies a first subset of bits of the input address to be included in the first key, and wherein a second template specifies a second subset of the bits of the input address, different from the first subset, to be included in the second key.

15. The apparatus according to claim 11, wherein at least one entry of the single hash table specifies a logical condition that, when applied to the input address, produces a conclusive result of whether the input address falls within one or more of the ranges.

16. The apparatus according to claim 15, wherein the logical condition specifies one or more sub-ranges for checking against the address.

17. The apparatus according to claim 11, wherein at least one entry of the single hash table specifies multiple address sub-ranges that correspond to multiple respective conclusive results.

18. The apparatus according to claim 11, wherein the conclusive result further indicates at least one of the ranges in which the address falls.

19. The apparatus according to claim 11, wherein the ranges are assigned respective priorities, and wherein the processor is configured to define the single hash table so as to return range-matching results in accordance with the priorities.

20. The apparatus according to claim 11, wherein the processor is configured to update the entries to reflect a change in the ranges, without interrupting access to the entries.

21. A computer software product, the product comprising a tangible non-transitory computer-readable medium in which program instructions are stored, which instructions, when read by a processor, cause the processor to pre-process a definition of one or more ranges of addresses of interest so as to determine a number of bits of a first template, comprising a mask that selects the number of most significant bits of an address and masks the other bits, and generate a single hash table that is queried by a first key produced by applying the first template to an address, wherein the single hash table comprises multiple entries, such that a given entry specifies either a conclusive result of whether the address falls within one or more of the ranges, or an inconclusive result with an updated template for applying to the address before querying the single hash table again, to produce a first key by applying the first template to an input address, and querying the single hash table with the first key, and, depending on the result, to either output the result or to query the single hash table again in accordance with the updated template specified in an entry of the single hash table corresponding to the first key, wherein the updated template includes more of the significant bits of the input address than the template.

* * * * *